United States Patent Office 2,904,440
Patented Sept. 15, 1959

2,904,440

PROCESS FOR PREPARING A SOLID FLAVORING COMPOSITION

Keene P. Dimick, Walnut Creek, and Benjamin Makower, Berkeley, Calif., assignors to the United States of America as represented by the Secretary of Agriculture No Drawing. Application July 14, 1953
Serial No. 368,016

3 Claims. (Cl. 99—140)

(Granted under Title 35, U.S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to and has among its objects the provision of processes for purifying flavoring agents, particularly volatile fruit essences, and for producing solid flavoring compositions from the purified material. A particular object of the invention is the provision of processes for removing water and low-molecular weight alcohols from fruit essences whereby to enable the production of effective solid flavoring compositions therefrom. These and further objects of the invention will be obvious from the description herein.

In the production of various foodstuffs such as dehydrated fruit juices, gelatin dessert mixes, low-methoxyl pectin pudding mixes, dehydrated ice cream and sherbet mixes, etc. it is often desirable to enhance the flavor qualities of the product by adding thereto flavoring materials in solid, essentially non-volatile and stabilized form. Such a result may be accomplished with some commodities by incorporating with the foodstuff a solid sorbitol-flavoring agent composition. Compositions of this nature may be prepared by incorporating a flavoring agent, such as orange oil, with molten sorbitol and allowing the mixture to cool and solidify. The solid product consists of a matrix of crystalline sorbitol with minute droplets of the orange oil dispersed throughout the matrix and entrapped within the crystalline sorbitol. The product can also be regarded as a solid emulsion or sol wherein sorbitol is the continuous phase and the orange oil is the disperse phase. The product is an emulsion because the orange oil is insoluble in sorbitol (molten or solid). In such compositions, the sorbitol has the effect of stabilizing the flavoring agent against deteriorative changes and also prevents evaporation of the flavoring agent which by itself is volatile. The sorbitol compositions are thus useful for imparting to foodstuffs an enhanced and stabilized flavor.

Although the above-outlined technique of preparing sorbitol-flavoring agent compositions works well with many essential oils such as orange oil, lemon oil, lime oil, grapefruit oil and the like, it is not universally applicable to all flavoring agents. For example, if it is attempted to substitute the essence of non-citrus fruit such as pear, grape, strawberry, raspberry, cherry, apple, pineapple and the like for orange oil, unfavorable results will be obtained in that the sorbitol dissolves in the essence so that solid compositions cannot be attained unless a very large proportion of sorbitol is used. Further, even if a solid composition is obtained, the flavoring components are not emulsified therein and they are not adequately protected from vaporization nor are they stabilized against oxidative and other deteriorative reactions. The reason for these deleterious effects is that fruit essences contain water and low-molecular weight alcohols (mostly ethanol and usually also methanol, propanol, isopropanol and the like). Thus it is known that water exerts a deleterious effect because it tends to dissolve the sorbitol so that a solid composition cannot be achieved unless very excessive proportions of sorbitol are employed. Our experimental investigations have also shown that the low-molecular weight alcohols which are commonly present in fruit essences and similar flavoring agents also cause deleterious effects. The primary difficulty is that the low-molecular weight alcohols prevent proper emulsification with the sorbitol. Thus when the fruit essence containing low-molecular weight alcohols is mixed with molten sorbitol, these alcohols and some of the flavoring components dissolve in the molten sorbitol. Upon cooling, most of the sorbitol crystallizes and there is also formed a liquid phase composed of the low-molecular weight alcohols, flavoring components, and sorbitol. This liquid phase is distributed in the solid mass of crystalline sorbitol in the form of a network of interconnecting liquid-filled channels. Many of these channels extend to the outer surfaces of the solid mass. These channels provide paths by which vaporization of the flavoring components may take place and by which oxygen may enter to cause deterioration of the flavoring components. Under such circumstances, the flavoring component is not protected from vaporization and oxidative or other deteriorative reactions as is the case with orange oil (or other citrus oil) where the composition consists of minute droplets of the oil entrapped in the crystalline sorbitol mass with no channelling.

It has now been found that the problems described above can be alleviated by removing essentially all the water and low-molecular weight alcohols from the flavoring agent, by methods to be described herein, prior to forming the composition with sorbitol. Our invention therefore makes it possible for the first time to prepare effective sorbitol-flavoring agents compositions wherein the flavoring agent is derived from apples, pears, peaches, grapes, pineapples, cherry, raspberry, strawberry, prunes, plums, and other non-citrus fruits wherein the flavoring agent is necessarily recovered in admixture with water and low-molecular weight alcohols. This significant aspect of the invention will be obvious from the following explanation. In the case of citrus fruits it is a simple matter to prepare the flavoring agent in suitable form for direct incorporation with sorbitol to form the solid composition. Thus the peel of the citrus fruit need but be pressed to obtain the essential oil in an essentially pure state suitable for direct incorporation in molten sorbitol. However, obtaining the flavoring essences from non-citrus fruits is not so simple because the essence is distributed throughout the whole fruit, not only in the peel. Customarily the essence is produced by forming a juice or puree, or other liquid preparation from the fruit and subjecting the juice to evaporation, the essence being then recovered from the vapors by use of condensers, rectifying columns, scrubbers, or similar equipment. In any event the essence is not recovered in a pure state but is largely water and low-molecular weight alcohols with but a very minor proportion of the actual flavoring matter. Although the essences can be concentrated to a substantial degree by distillation in efficient columns, at best they remain largely a solution of a minor proportion of the flavoring component in water and low-molecular weight alcohols. In this connection it must be realized that the flavoring components are not individual compounds but the flavor of each commodity is a complex mixture of many different compounds such as esters, ethers, aldehydes, ketones, etc. in a wide range of molecular weights. Purification by distillation can never be completely effective because many of the individual flavor components have boiling points close to that of water and that of the low molecular weight alcohols or form azeotropes with water or alcohols. Thus too sharp a fractionation will result in removal of important elements of flavor. Also there is the question of heat sensitivity so that too much exposure to elevated temperatures will effect chemical changes which will destroy the delicate balance of flavor elements in the essence. In view of the above considerations it would have been believed that it would be impossible to prepare solid sorbitol-containing compositions from non-citrus fruit essences.

In proceeding in accordance with this invention, the fruit essence or other flavoring agent which contains water and low molecular weight alcohols is first extracted with an essentially water-immiscible volatile solvent such as isopentane. There is thus obtained a solvent phase containing the desired flavoring components dissolved in the solvent and an aqueous phase containing water and low molecular weight alcohols. The solvent phase is separated and then subjected to evaporation to remove the solvent, leaving the flavoring components as a residue. The residual material is a highly concentrated form of the original essence and being essentially free from water and low molecular weight alcohols, it is eminently suitable for forming a solid flavoring composition. To this end, sorbitol is melted then preferably cooled to below its melting point (supercooled). The flavoring component in the proportion of about 1 to 20% of the weight of the sorbitol, is then stirred into the molten sorbitol and the melt allowed to cool and solidify, preferably adding first a few crystals of the metastable form of sorbitol to promote crystallization of the metastable form of sorbitol (spherulitic crystals). The metastable form of sorbitol is preferred because it is a glassy solid mass which can be ground into granular particles each particle retaining the dispersed minute droplets of flavoring agent. The stable form of sorbitol is crumbly and tends to break up into a fine powder which does not retain the flavoring material.

In the preferred modification of the invention, before the solvent phase is evaporated an oily vehicle is added thereto. In such case, the residue after evaporation is a solution of the flavoring components in the vehicle. This solution is then incorporated into sorbitol by the technique described hereinabove. The amount of vehicle to add to the solvent extract is not critical, generally an excess of the vehicle is added to ensure solution of the flavoring components. Thus the volume of vehicle may be, for example, from 2 to 10 times the volume of the actual flavoring components. This technique of adding a vehicle has many advantages. In the first place the vehicle acts as an extender or diluent and makes it more convenient to handle the minute amount of flavoring component remaining after the evaporation by increasing the bulk or volume of material. Secondly, the vehicle assists in obtaining complete emulsification of the flavoring material with sorbitol and leads to the production of a solid flavoring composition wherein the flavoring material is stabilized and prevented from evaporation. This situation may be explained as follows: In many cases the concentrated flavoring material obtained after evaporation of the solvent still contains small amounts of low molecular weight alcohols and/or other chemical compounds which exhibit properties like those of the low molecular weight alcohols. These constituents exert deleterious effects in that they retard proper emulsification with the molten sorbitol and lead to the formation of solid compositions wherein the flavor particles are not entrapped in droplet form but exist in interstices and channels between crystals so that stabilization of flavor and prevention of vaporization are not achieved. However the presence of the vehicle counteracts these undesirable effects so that complete emulsification is obtained and the solid product contains the flavor particles entrapped as minute droplets within the crystalline sorbitol mass and thus protected from evaporation and stabilized against oxidative and other deleterious reactions.

Regarding the solvent for extracting flavoring components from the water and alcohol-containing essence, this agent should be volatile and preferably boil at not over about 60° C. so that it can be readily evaporated from the subsequent extract without causing heat damage to the flavoring components or loss thereof by vaporization. The solvent should also be one in which water and aqueous alcohol are essentially insoluble so that it will be effective in separating the flavoring elements from the accompanying water and low molecular weight alcohols. Although isopentane is the preferred solvent, other substances having similar properties can be used, for example, butane, isobutane, pentane, 2,2-dimethyl propane, hexane, isohexane, and so forth. In the case of butane and isobutane, the extraction would have to be carried out under refrigeration and/or superatmospheric pressure to maintain the solvent in the liquid phase. The extraction may be carried out by conventional techniques; for large scale operation it is preferred to use countercurrent continuous extraction whereby to obtain efficiency of operation and to require less solvent per unit of essence treated.

Regarding the oily vehicle, we prefer to use an edible oil as the vehicle, preferably an oil which has been purified so that it is essentially bland and odorless. Suitable oils are for example, cottonseed, olive, sesame, rice bran, peanut, soybean, butter, and the like. Instead of naturally-occurring triglyceride oils, one can also use individual compounds which meet the requirements that they be of an oily nature, essentially non-volatile, non-toxic, essentially tasteless and odorless, and exhibit essential insolubility in sorbitol (liquid and solid). Examples of other suitable vehicles are diethyl malate, diethyl succinate, ethyl palmitate, ethyl oleate, mono-aceto-distearin, mono-aceto-diolein, mono-aceto-dipalmitin, di-aceto-monostearin, di-aceto-mono-olein, di-aceto-monopalmitin, and the like.

As an alternative modification of this invention, particularly applicable where the fruit essence has been first concentrated to a high degree by distillation or other methods, the essence may be extracted with the oily vehicle instead of the volatile solvent. In such case a solution of the flavoring components dissolved in the oily vehicle is obtained directly. This eliminates the need for using a volatile solvent and eliminates the evaporation step. In proceeding in accordance with this technique, the fruit essence is first concentrated, as by distillation, to at least a 1000-fold degree. The concentrated essence is then extracted with the oily vehicle using a volume of vehicle on the order of 2 to 10 times the volume of actual flavoring components in the concentrated essence. The vehicle phase containing the dissolved flavoring components is separated from the phase containing water and low-molecular weight alcohols. The vehicle phase can then be incorporated in sorbitol by the technique described above.

The invention is further illustrated by the following example:

*Example*

A quantity of fresh grape juice was subjected to evaporation at atmospheric pressure to vaporize about 30% of the juice. The evolved vapors were introduced into a rectifying distillation column to separate the essence from the steam. The distilled grape essence (about 33-fold) was then concentrated by distillation in an efficient fractionating column to obtain a 400-fold concentrate.

Three hundred and fifty grams of the concentrated (400-fold) grape essence was then extracted several times with a total of about 150 cc. of isopentane. The isopentane extract containing the grape flavoring components was then separated from the aqueous phase and mixed with 5.1 grams of purified rice oil. The resulting solution was then subjected to heat to vaporize off the isopentane. There was obtained as a residue, 7.2 grams of a solution of the grape flavoring components dissolved in a rice oil. This solution represented an approximate 19,000-fold (by weight) concentrate of the flavor, that is, 1 gram of the solution represented the amount of flavor present in about 19,000 grams of the original single-strength grape juice.

One hundred grams of sorbitol was heated to 214° C. to drive off any water that might be present therein. The molten sorbitol was then cooled to 80° C. and the above-described oil solution emulsified therewith using vigorous stirring. The mixture was then cooled to 71° C. and about 0.4 g. of sorbitol crystals (metastable solid form) was stirred in as seed to promote crystallization of the metastable form of sorbitol. The liquid mass was then poured on a sheet of stainless steel and allowed to cool and solidify. The solid composition was then ground into the form of granules and subjected overnight to a vacuum to remove the minor fraction of flavor components which was on the outside of sorbitol crystals rather than entrapped in sorbitol crystals.

Microscopic examination of the product showed that it consisted of a matrix of spherulitic crystals of sorbitol (metastable form) with minute particles, about 10-50 microns in diameter, of oil-flavoring component solution dispersed throughout the matrix and entrapped within the crystalline mass. There was no channeling present. A microscopic comparison of the product with a composition which was made by incorporating orange oil in molten sorbitol, followed by cooling showed that both were in the same physical state—both being solid emulsions or sols with sorbitol as the continuous phase with the oil solution of grape essence and the orange oil, respectively, as the disperse phases.

It was found that when the product was subjected to vacuum even for extended periods of time, there was no diminution in the flavoring power of the composition.

A full-flavored dehydrated grape juice powder was prepared by mixing 1 g. of the aforesaid composition with 150 g. of a flavor-deficient powder produced by concentrating grape juice then dehydrating the concentrated grape juice by the application of heat and vacuum. The resulting flavor-enriched powder formed on reconstitution a juice having a natural flavor, virtually indistinguishable from the freshly prepared juice. Storage of the flavor-enriched powder, in a sealed container together with a porous packet containing CaO as a desiccant, for extended periods up to 6 months at 100° F. resulted in no diminution of the flavor of the juice prepared therefrom.

Having thus described the invention, what is claimed is:

1. A process for preparing solid flavoring compositions from a volatile flavoring essence containing a minor proportion of flavoring components and a major proportion of water and low molecular weight alcohols which comprises extracting said essence with a volatile organic solvent in which the flavoring components are soluble but in which water and aqueous alcohol are relatively insoluble, separating the solvent extract containing the flavoring components, adding an edible oil thereto and evaporating the solvent thus to obtain a concentrated and purified solution of the flavoring components in edible oil, incorporating said solution in molten sorbitol and allowing the mixture to cool and solidfy.

2. The process of claim 1 wherein the volatile flavoring essence is a non-citrus fruit essence.

3. The process of claim 1 wherein the volatile flavoring essence is a non-citrus fruit essence and the solvent is isopentane.

References Cited in the file of this patent

UNITED STATES PATENTS

| | | |
|---|---|---|
| 1,829,431 | Allen | Oct. 27, 1931 |
| 2,566,410 | Griffin | Sept. 4, 1951 |
| 2,571,867 | Hall et al. | Oct. 16, 1951 |
| 2,571,948 | Sair et al. | Oct. 16, 1951 |

FOREIGN PATENTS

| | | |
|---|---|---|
| 486,347 | Great Britain | June 2, 1938 |